(12) United States Patent
Kisaka

(10) Patent No.: US 7,573,667 B2
(45) Date of Patent: Aug. 11, 2009

(54) SERVO INFORMATION WRITE METHOD AND APPARATUS

(75) Inventor: Masashi Kisaka, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 592 days.

(21) Appl. No.: 11/282,867

(22) Filed: Nov. 17, 2005

(65) Prior Publication Data

US 2006/0126203 A1 Jun. 15, 2006

(30) Foreign Application Priority Data

Dec. 13, 2004 (JP) .............................. 2004-359633

(51) Int. Cl.
*G11B 5/09* (2006.01)

(52) U.S. Cl. .................. 360/53; 360/31; 360/48; 360/75; 360/77.02; 360/78.04

(58) Field of Classification Search ............ 360/31, 360/48, 53, 75, 77.02, 78.08
See application file for complete search history.

(56) References Cited

U.S. PATENT DOCUMENTS

| 5,333,140 | A | * | 7/1994 | Moraru et al. ............. 714/719 |
| 5,553,086 | A | * | 9/1996 | Sompel et al. ............. 714/798 |
| 5,798,883 | A | * | 8/1998 | Kim ............................ 360/31 |
| 6,181,500 | B1 | * | 1/2001 | Serrano et al. .............. 360/53 |
| 6,324,660 | B1 | * | 11/2001 | Majima et al. ............. 714/710 |
| 6,366,419 | B1 | * | 4/2002 | Gaub et al. ................... 360/48 |
| 6,414,814 | B1 | * | 7/2002 | McKenzie et al. ....... 360/77.03 |
| 6,442,705 | B1 | * | 8/2002 | Lamberts ....................... 714/2 |
| 6,760,180 | B2 | * | 7/2004 | Kino et al. .................... 360/75 |
| 6,798,592 | B1 | * | 9/2004 | Codilian et al. .............. 360/51 |
| 6,809,893 | B2 | * | 10/2004 | Uzumaki et al. ............. 360/31 |
| 6,947,234 | B2 | * | 9/2005 | Lamberts et al. ............ 360/53 |
| 7,245,447 | B2 | * | 7/2007 | Zaitsu ......................... 360/60 |
| 2003/0021051 | A1 | * | 1/2003 | Suzuki et al. ................ 360/53 |
| 2004/0080849 | A1 | * | 4/2004 | Kimura et al. ............... 360/53 |
| 2004/0105185 | A1 | | 6/2004 | Park et al. |
| 2005/0180267 | A1 | * | 8/2005 | Jeong et al. .................. 368/96 |

\* cited by examiner

*Primary Examiner*—Hoa T Nguyen
*Assistant Examiner*—Dismery E Mercedes
(74) *Attorney, Agent, or Firm*—Townsend and Townsend and Crew LLP; Patrick Duncan

(57) ABSTRACT

Embodiments of the invention provide a servo information write method that makes it possible to properly locate the last-written servo information even when old servo information is overwritten by new servo information. In one embodiment, a servo track writer controller, which is within a servo track writer, reads a serial number (S/N) from a HDD (step 101), and acquires a magnetic disk drive servo information write count (P-ID) from a manufacturing process host (step 102). The next step (step 103) is then performed to control a positioner and a read/write channel so as to start writing servo information onto a magnetic disk. Servo information is sequentially written until the last track is written into (step 104). When the Nth servo information is to be written, a P-ID (N) is written subsequently to a burst signal (step 105). When the last track is written into in step 104, step 106 is performed to notify the manufacturing process host that the Nth servo information write is performed. Then, the servo information write process ends.

7 Claims, 5 Drawing Sheets

SERVO INFORMATION WRITE METHOD AND APPARATUS

CROSS-REFERENCES TO RELATED APPLICATIONS

This application claims priority from Japanese Patent Application No. JP2004-359633, filed Dec. 13, 2004, the entire disclosure of which is incorporated herein by reference.

BACKGROUND OF THE INVENTION

The present invention relates to a method and apparatus for writing servo information onto a magnetic disk in a magnetic disk drive, and more particularly to a rewrite method that is used when the servo information is not normally written.

The magnetic disk drive has a magnetic head, which reads data recorded on a magnetic disk or writes data onto the magnetic disk. The magnetic head is mounted in an actuator mechanism, which is oscillated by a VCM (Voice Coil Motor). When the magnetic head reads or writes data, the actuator mechanism is driven to move and position the magnetic head over a designated track. Motion control is exercised in accordance with servo information, which is recorded on the magnetic disk, so that the magnetic head moves to a designated position.

A plurality of data tracks are concentrically formed on the magnetic disk. Further, identification information and servo information, which contains a burst pattern, are prerecorded in the direction of the disk diameter. The identification information indicates the track address of each data track. The identification information, which is to be read by the magnetic head, makes it possible to determine the approximate position of the magnetic head, that is, to determine what data track corresponds to the magnetic head position. The burst pattern comprises a plurality of burst pattern rows in which signal storage areas are arrayed at fixed intervals in the direction of the disk diameter. The plurality of burst pattern rows differ in signal recording area phase. The magnetic head generates a signal in accordance with a burst pattern. The signal generated in this manner makes it possible to determine the precise position of the magnetic head. More specifically, it is possible to detect the degree of deviation (positional error) of the magnetic head from a data track to which the magnetic head corresponds.

For a magnetic disk data read or magnetic disk data write operation, the magnetic head is moved until it corresponds to a specific data track while the approximate position of the magnetic head is determined in accordance with the identification information read by the magnetic head, with the magnetic disk rotating state. Then, the magnetic head is accurately positioned over a specific data track in accordance with the signal that is output from the magnetic head in accordance with a burst pattern. The data read/data write operation is performed after the magnetic head is accurately positioned as described above. The above sequence of operation is referred to as a seek operation. Further, while a data read/data write operation is being performed, feedback control is exercised in accordance with the signal that is output from the magnetic head in accordance with a burst pattern so that the magnetic head is set at a fixed position in relation to a specific data track. This operation is referred to as a track following operation.

The magnetic disk drive servo information is written from the outside by using the magnetic head of a servo track writer or written with the magnetic head of the magnetic disk drive. If the servo information cannot be written normally, it is necessary to erase the previously written information and then try again. The previously written information should be erased beforehand to avoid a situation where a plurality of sets of servo information are allowed to exist in the same track. Formerly, erasure was achieved by positioning a magnet near the magnetic disk during its rotation. However, the coercive force of the magnetic disk has increased with an increase in the degree of recording density. Therefore, the previously recorded servo information cannot be sufficiently erased.

The method disclosed by Patent Document 1 (Japanese Patent Laid-Open No. 57718/2000) is used to rewrite servo information without erasing any previously written servo information from the magnetic disk. A new servo pattern is written into a track of the disk by using a staggered wedge method. When a R/W head reaches the first track, which is positioned beyond the disk's inner crash stop (inside the inner crash stop), the first R/W head writes new servo information and then operates to write data into various sectors of the whole track. On the other hand, the other R/W heads remain inoperative. The data overwrites certain servo information existing in the track. Subsequently, the second R/W head writes new servo information and then operates to write data into various sectors of the whole track. On the other hand, the other R/W heads remain inoperative. During a power-on sequence, the R/W heads move toward a part of the disk, which is used to record the new servo pattern and new data and positioned beyond the inner crash stop, for the purpose of reading a new servo pattern.

BRIEF SUMMARY OF THE INVENTION

When the method of erasing servo information by positioning a magnet near the magnetic disk is used in a situation where servo information cannot be written normally onto the magnetic disk, the permanent magnet of a spindle motor, which supports the magnetic disk, is adversely affected if the magnetic force of the positioned magnet is excessively raised to sufficiently erase previously recorded servo information. When the method of writing servo information over existing servo information is employed, new servo information and old servo information coexist in the same track because a perfect overwrite cannot be performed. In such a case, therefore, the magnetic disk drive may start running using the old servo information.

A first feature of the present invention is to provide a servo information write method that makes it possible to properly locate the last-written servo information even in a situation where servo information is rewritten by performing an overwrite without erasing any previously recorded servo information.

A second feature of the present invention is to provide a servo track writer that is capable of writing servo information within a short period of time while consuming a small amount of power.

According to one aspect of the present invention, there is provided a servo information write method comprising the steps of: writing servo information and the write count of the servo information onto a magnetic disk; reading the servo information and checking for an abnormal write in accordance with the write count; determining, if the servo information is not normally written, what number servo information is to be rewritten; and overwriting servo information for a rewrite and the write count of the servo information.

In some embodiments, the write count is written at the trailing end of the servo information. The servo information includes at least track position information and a burst signal.

The write count is positioned at the trailing end of the burst signal. The servo information write method further comprises the step of writing test data in a data recording area between sets of the servo information when the servo information is normally written.

According to another aspect of the present invention, there is provided a servo information write method for use with equipment that includes a host for retaining a number unique to a magnetic disk drive and the servo information write count of the magnetic disk drive, a servo track writer for writing servo information onto a magnetic disk in the magnetic disk drive, and a tester for checking for an abnormal servo information write. The servo information write method comprises the steps of: reading a number unique to the magnetic disk drive when the servo track writer writes servo information onto a magnetic disk in the magnetic disk drive; acquiring the servo information write count of the magnetic disk drive from the host in accordance with the read unique number; writing servo information and the write count of the servo information onto the magnetic disk; reporting the write count of the servo information to the host; causing the tester to acquire the servo information write count of the magnetic disk drive from the host in accordance with the unique number of the magnetic disk drive; noting the acquired servo information write count to check whether the servo information read by the magnetic disk drive is normally written; causing, if the servo information is not normally written, the servo track writer to determine what number servo information is to be rewritten; and causing the servo track writer to overwrite servo information for a rewrite and the write count of the servo information.

In some embodiments, the step of checking whether the servo information is normally written further includes the steps of: reporting the servo information write count acquired by the tester to the magnetic disk drive; and checking whether the servo information write count that the magnetic disk drive read from a magnetic disk coincides with the servo information write count reported by the tester. The servo information write method further comprises the step of writing test data in a data recording area between sets of the servo information when the servo information is normally written.

According to another aspect of the present invention, there is provided a servo track writer comprising a push pin for pushing and moving a magnetic disk drive's carriage in the radial direction of a magnetic disk; a positioner for moving the push pin so that a magnetic head supported by the carriage via a suspension is placed at a servo information write position of the magnetic disk; and a servo information write control circuit for instructing a write circuit in the magnetic disk drive to write servo information and the write count of the servo information when the magnetic head is placed at the servo information write position.

In specific embodiments, the servo information includes at least track position information and a burst signal. The write count is positioned at the trailing end of the burst signal. The servo information write control circuit determines the write count of servo information if the servo information is rewritten.

The present invention provides a servo information write method that makes it possible to properly locate the last-written servo information even in a situation where servo information is rewritten by performing an overwrite without erasing any previously recorded servo information.

The present invention also provides a servo track writer that is capable of writing servo information within a short period of time while consuming a small amount of power.

DETAILED DESCRIPTION OF THE INVENTION

Figure 1:
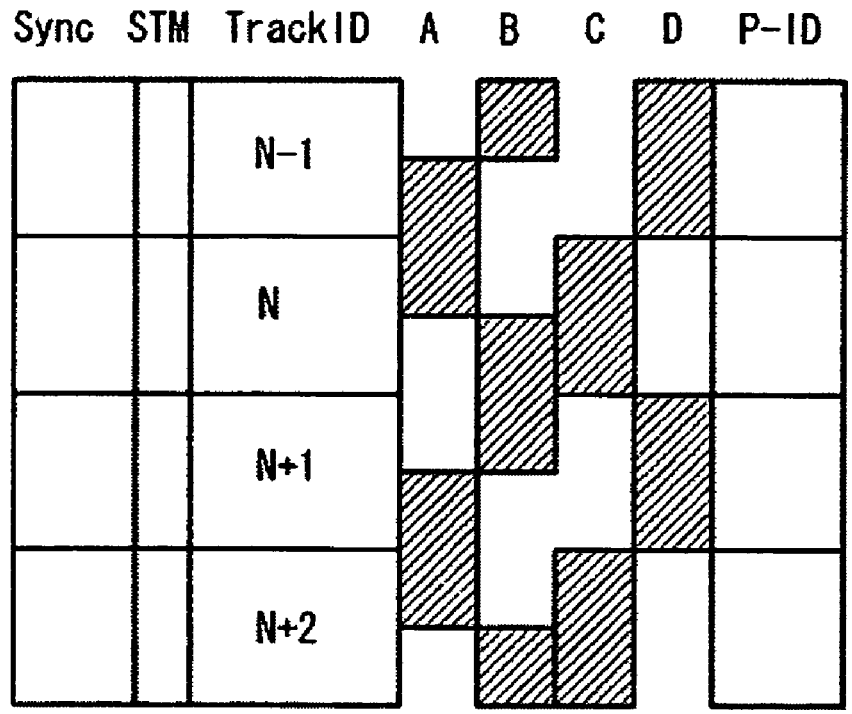
FIG. 1 illustrates a servo information format according to one embodiment of the present invention.
Figure 2:
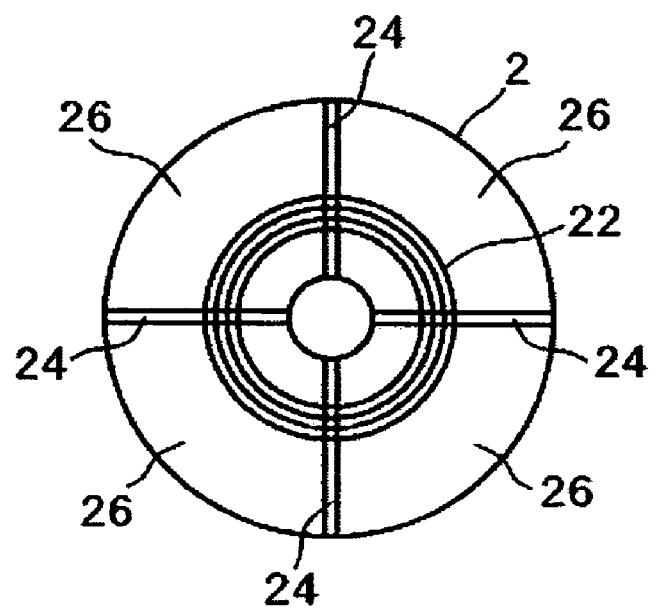
FIG. 2 shows recording areas on a magnetic disk recording surface.

The servo information arrangement on a magnetic disk and the servo information format will now be described in accordance with one embodiment of the present invention and with reference to FIGS. 1 and 2. As shown in FIG. 2, a plurality of servo information recording areas 24 are radially formed on each recording surface of a magnetic disk 2. These servo information recording areas 24 are arranged in the direction of the diameter of the magnetic disk 2. The remaining areas are user data recording areas 26. Since a plurality of tracks 22 are concentrically formed, they circumferentially contain the servo information recording areas 24 and user data recording areas 26. FIG. 1 shows a servo information format that is used for a servo information write. Servo information comprises read signal synchronization information (sync), a servo track mark (STM) for indicating the beginning of servo data, track position information (track ID), burst signals (A, B, C, and D) for indicating the position of a magnetic head relative to a track, and servo information write count information (P-ID). The track position information (track ID) is track identification information that uses a Gray code (cyclic binary code) to indicate the track address of a track 22. The burst signals (A, B, C, and D) are four burst pattern rows (A through D), which are arranged in the direction of the diameter of the magnetic disk 2.

Figure 3:
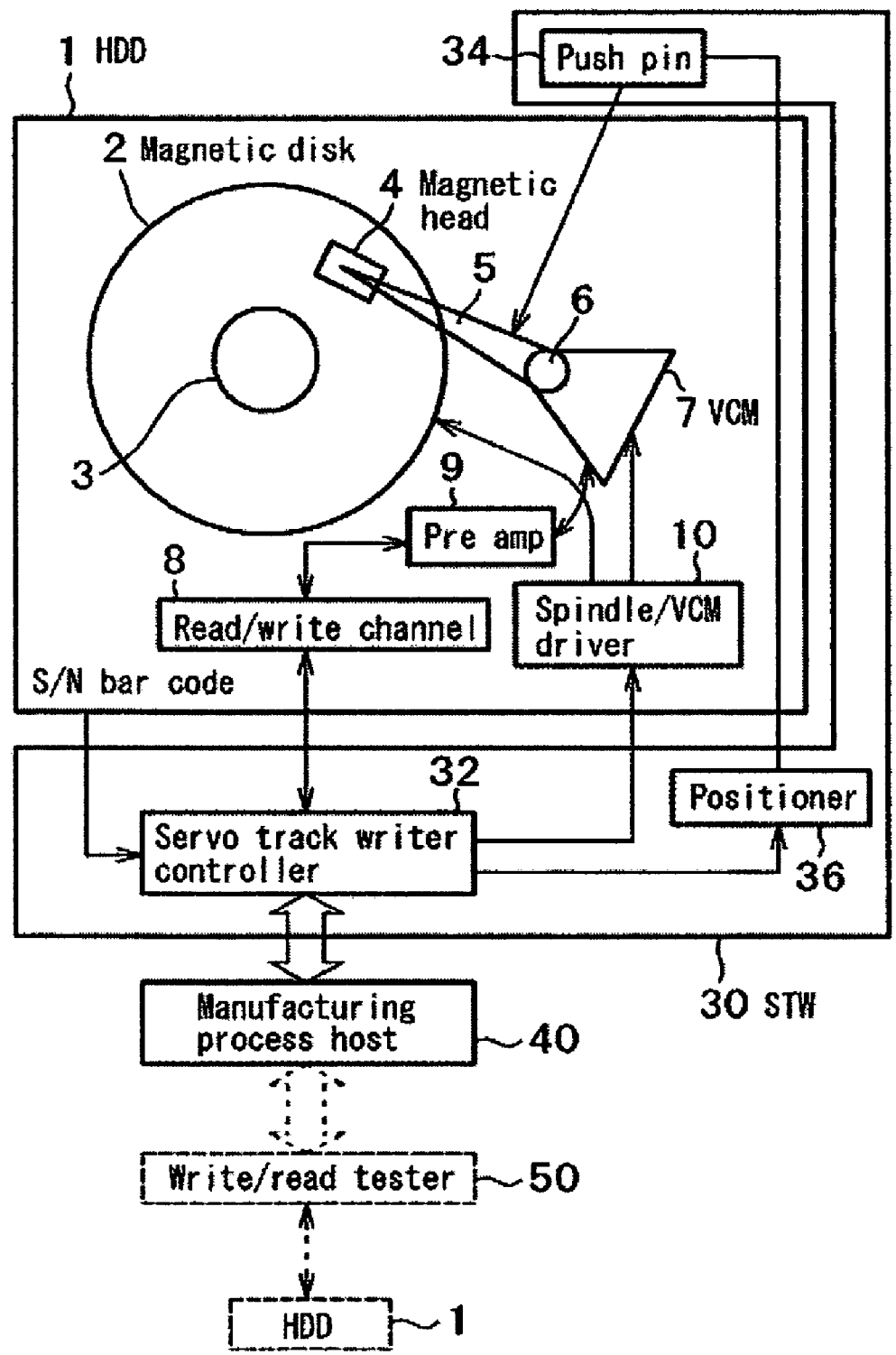
FIG. 3 is a block diagram illustrating the configurations of a servo track writer and magnetic disk drive according to one embodiment of the present invention. In this figure, a write/read tester is also indicated by a broken line.
Figure 4:
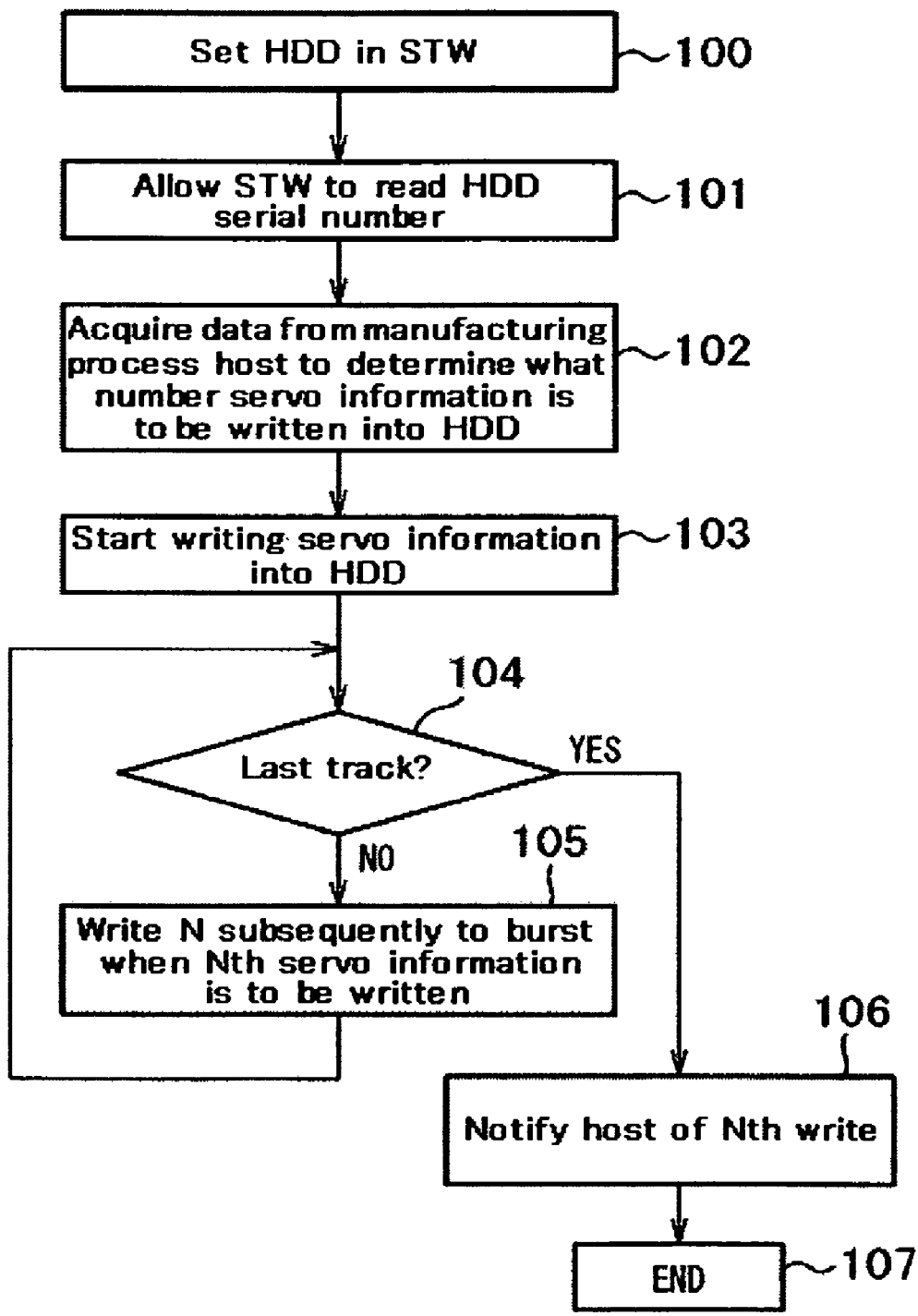
FIG. 4 is a flowchart illustrating a servo information write process.

A servo information write method and servo track writer (STW) according to one embodiment of the present invention will now be described with reference to FIGS. 3 and 4. Portions enclosed by solid lines in FIG. 3 represent the block for a magnetic disk drive (HDD) 1 and the block for the STW 30. The HDD 1 comprises a magnetic disk 2, a magnetic head 4, a VCM (voice coil motor) 7, a read/write channel 8, and a spindle/VCM driver 10. The magnetic disk 2 is supported by a spindle motor 3. The magnetic head 4 is supported by a carriage 6 via a suspension 5. The VCM 7 is supported by the carriage 6 and causes the magnetic head 4 to perform a seek operation in the radial direction of the magnetic disk 2. The read/write channel 8 is a write circuit that receives write data from a host apparatus, converts the write data into a signal that is to be recorded on the magnetic disk 2, outputs the resulting signal to a preamplifier (pre amp) 9, receives a signal read by the magnetic head 4 via the preamplifier 9, and converts the received signal into a data that is to be transmitted to the host apparatus. The spindle/VCM driver 10 supplies a drive current to the spindle motor 3 and VCM 7.

The STW 30 includes a servo track writer controller (servo information write control circuit) 32, a push pin 34, and a positioner 36. The servo track writer controller 32 provides control over servo information write operations. The positioner 36 sets the HDD 1 and uses the push pin 34 to properly position the magnetic head 4 of the HDD 1. A manufacturing process host 40 comprises a processor, which provides control over overall operations, and a database for storing a number unique to the magnetic disk drive and servo information write count information (P-ID), which indicates what number servo information is to be written in the HDD 1.

When servo information is to be written, the spindle motor 3 rotates the magnetic disk 2 at a constant speed. A fixed drive current flows from the spindle/VCM driver 10 to the VCM 7. The carriage 5 moves together with the push pin 36 when the push pin 36 applies a fixed pushing force to the carriage 5. The manufacturing process host 40 instructs the servo track writer controller 32 of the STW 30 to write servo information. The servo track writer controller 32 controls the positioner 36 and the read/write channel 8 of the magnetic disk drive 1 to write the servo information onto the magnetic disk 2.

The servo information write method will now be described with reference to FIG. 4. First of all, step 100 is performed to set the HDD 1 in the positioner 36 of the STW 30 and establish the connection as described with reference to FIG. 3. In step 101, the servo track writer controller 32 reads a serial number (S/N) that is recorded in the HDD 1 with a bar code. Next, the servo track writer controller 32 acquires a P-ID from the manufacturing process host 40 (step 102). The P-ID indicates what number servo information is to be written. The servo track writer controller 32 then controls the positioner 36 and read/write channel 8 to start writing servo information onto the magnetic disk 2 (step 103). This servo information write operation is sequentially performed until the last track is written into (step 104). When the Nth servo information is to be written, a P-ID (N) is written subsequently to a burst signal (step 105). When the last track is written into in step 104, step 106 is performed to notify the manufacturing process host 40 that the Nth servo information write is performed. Then, the servo information write process ends (step 107).

Figure 5:
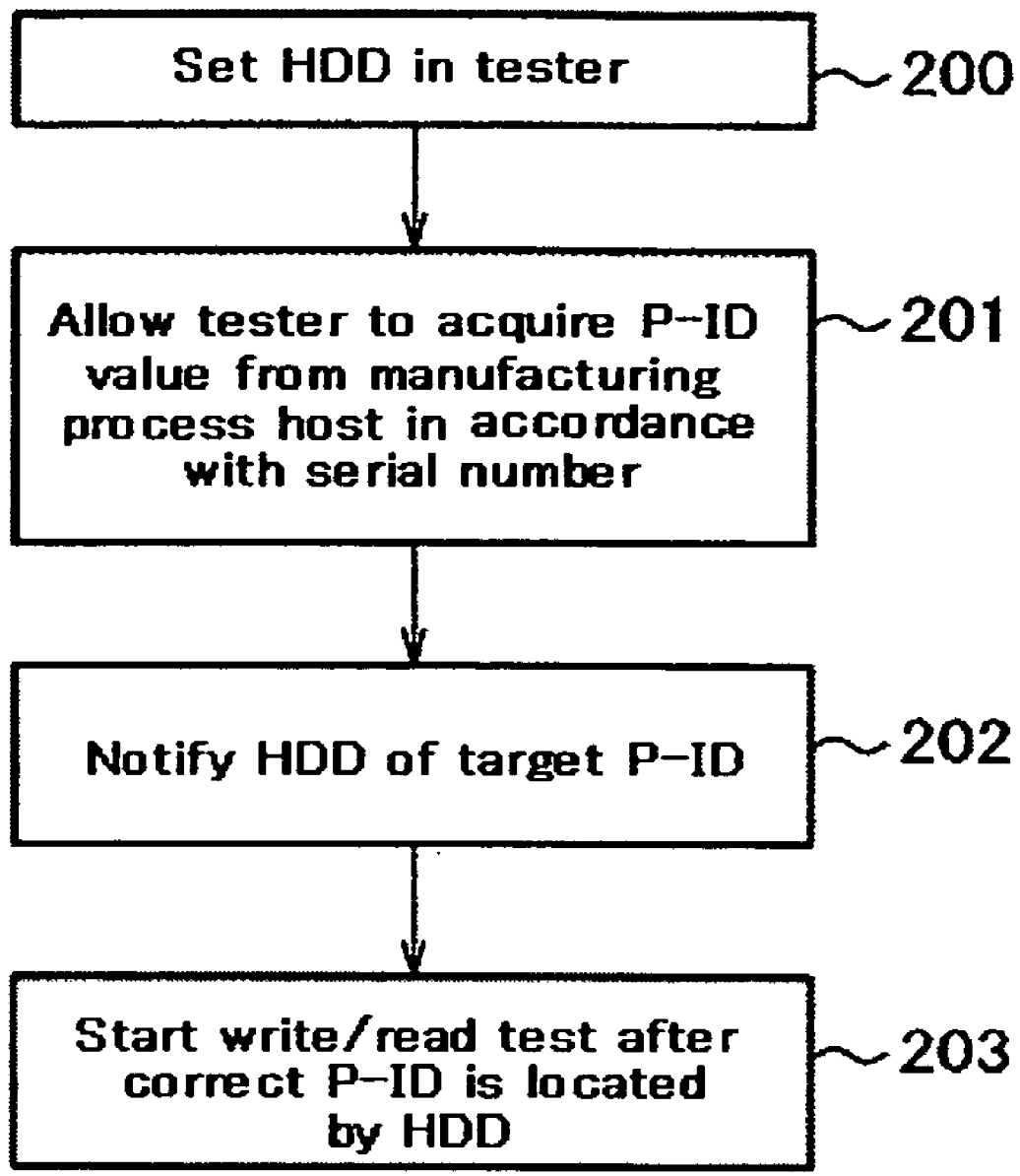
FIG. 5 is a flowchart illustrating a write/read tester preparation process that is performed when servo information is to be written.
Figure 6:
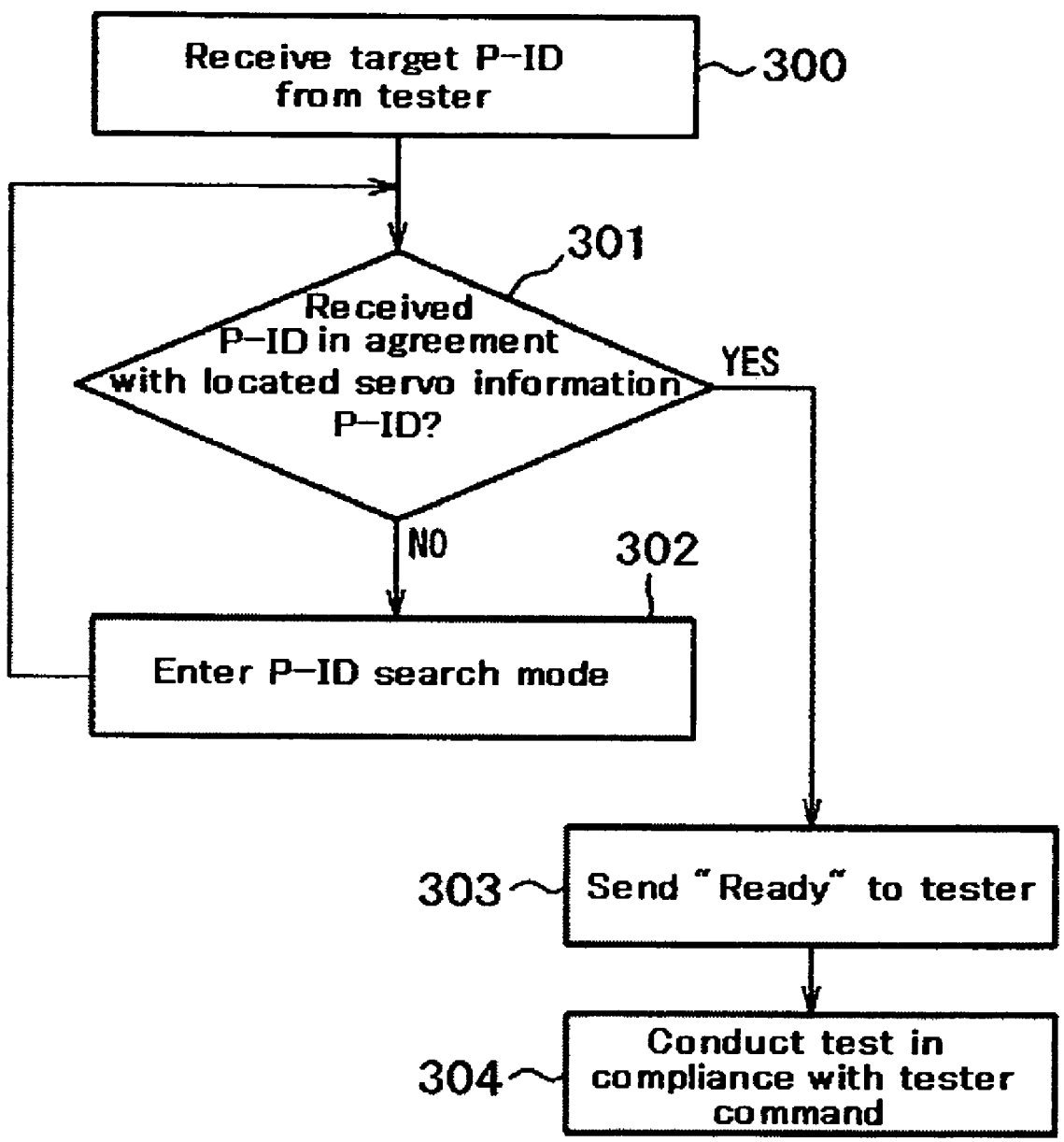
FIG. 6 is a flowchart illustrating how a magnetic disk drive operates to perform the write/read tester preparation process.

The write/read test preparations for the HDD 1 in which servo information is written will now be described with reference to FIGS. 3, 5, and 6. The broken line in FIG. 3 indicates that a write/read tester 50 is connected to the HDD 1 in which servo information is written. FIG. 5 is a flowchart illustrating a process that is performed to prepare the write/read tester 50. FIG. 6 is a flowchart illustrating the operation of the HDD 1. Referring to FIG. 5, the HDD 1 is first set in the write/read tester 50 (step 200). The write/read tester 50 reads a serial number (S/N) that is recorded in the HDD 1 with a bar code. Step 201 is then performed to acquire information (P-ID) from the manufacturing process host 40 in accordance with the serial number (S/N). The acquired information (P-ID) indicates what number servo information is written in the HDD 1. Next, step 202 is performed to notify the HDD 1 of the P-ID of the servo information to be retrieved (used). The HDD 1 conducts a track search in accordance with the received P-ID. When the correct servo information P-ID (N) is found, step 203 is performed to start a write/read test.

As shown in FIG. 6, the HDD 1 receives a target P-ID from the write/read tester 50 (step 300). The HDD 1 then checks whether the P-ID received from the write/read tester 50 matches the P-ID read from the magnetic disk 2 (step 301). If the P-IDs do not match, step 302 is performed to repeat a search. When the P-IDs match in step 301, a ready signal (Ready) is sent to the write/read tester 50 (step 303). Upon receipt of the ready signal (Ready), the write/read tester 50 conducts a write/read test in compliance with a test command (step 304).

In the read/write test, the magnetic head 4 reads the last-recorded servo information in accordance with the write count recorded on the magnetic disk 2 to check whether the track number (track ID) recorded with a Gray code and the burst signals (A, B, C, and D) are normal. If the servo information is not normal, the write/read test is considered to be in error so that control is returned to the servo track writer. A servo information write (rewrite) process is then performed as indicated in FIG. 4 to additionally write the servo information for a rewrite without erasing any previously written servo information. On the other hand, if the servo information is normal, the test data is written into a user data recording area 26, which follows a servo information recording area 24. At this stage, the test data overwrites the old servo information so that only the last-written servo information remains on the magnetic disk. Therefore, the next time the power is turned on, the HDD 1 can find correct servo information even if it does not know the associated P-ID.

As described above, one embodiment of the present invention finds the last-written, correct servo information at the time of a servo information rewrite without having to erase any previously written servo information. It is therefore possible to rewrite servo information within a short period of time while consuming a small amount of power. Further, it is not necessary to erase improperly written old servo information with a magnet. Consequently, it is possible to prevent the parts within the apparatus from being adversely affected.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims alone with their full scope of equivalents.

What is claimed is:

1. A servo information write method comprising:
    writing servo information and a write count of the servo information into each of a plurality of servo information recording areas radially formed on each recording surface of a magnetic disk; reading said servo information and checking for an abnormal write in accordance with said write count; determining, if said servo information is not normally written, what number servo information is to be rewritten; and overwriting servo information for a rewrite and the write count of the servo information in response to said determining, wherein said number is indicated by said write count.

2. A servo information write method comprising:
    writing servo information and a write count of the servo information onto a magnetic disk; reading said servo information and checking for an abnormal write in accordance with said write count; determining, if said servo information is not normally written, what number servo information is to be rewritten; and overwriting servo information for a rewrite and the write count of the servo information in response to said determining, wherein said number is indicated by said write count, wherein said write count is written at a trailing end of said servo information.

3. A servo information write method comprising:
    writing servo information and a write count of the servo information onto a magnetic disk; reading said servo information and checking for an abnormal write in accordance with said write count; determining, if said servo information is not normally written, what number servo information is to be rewritten; and overwriting servo information for a rewrite and the write count of the servo information in response to said determining, wherein said number is indicated by said write count, wherein said servo information includes at least track position information and a burst signal; and wherein said write count is positioned at a trailing end of said burst signal.

4. A servo information write method comprising: writing servo information and a write count of the servo information onto a magnetic disk; reading said servo information and checking for an abnormal write in accordance with said write count; determining, if said servo information is not normally written, what number servo information is to be rewritten; and overwriting servo information for a rewrite and the write count of the servo information in response to said determining, wherein said number is indicated by said write count, further comprising writing test data in a data recording area between sets of said servo information when said servo information is normally written.

5. A servo information write method for use with equipment that includes a host for retaining a number unique to a magnetic disk drive and a servo information write count of the magnetic disk drive, a servo track writer for writing servo information onto a magnetic disk in the magnetic disk drive, and a tester for checking for an abnormal servo information write, the servo information write method comprising:

reading a number unique to the magnetic disk drive when said servo track writer writes servo information onto a magnetic disk in the magnetic disk drive;

acquiring the servo information write count of the magnetic disk drive from said host in accordance with the read unique number;

writing servo information and the write count of the servo information onto said magnetic disk;

reporting the write count of said servo information to said host;

causing said tester to acquire the servo information write count of the magnetic disk drive from said host in accordance with the unique number of said magnetic disk drive;

noting the acquired servo information write count to check whether the servo information read by said magnetic disk drive is normally written;

causing, if said servo information is not normally written, said servo track writer to determine what number servo information is to be rewritten; and causing said servo track writer to overwrite servo information for a rewrite and the write count of the servo information.

6. The servo information write method according to claim 5, wherein checking whether said servo information is normally written further includes:

reporting the servo information write count acquired by said tester to said magnetic disk drive; and checking whether the servo information write count that said magnetic disk drive read from a magnetic disk coincides with the servo information write count reported by said tester.

7. The servo information write method according to claim 5, further comprising writing test data in a data recording area between sets of said servo information when said servo information is normally written.

* * * * *